United States Patent [19]

Bowden

[11] Patent Number: 4,880,714

[45] Date of Patent: Nov. 14, 1989

[54] METHOD FOR PREPARING NON-AQUEOUS ELECTROLYTES

[75] Inventor: William L. Bowden, Nashua, N.H.

[73] Assignee: Duracell Inc., Bethel, Conn.

[21] Appl. No.: 316,355

[22] Filed: Feb. 27, 1989

[51] Int. Cl.$^4$ ............................................. H01M 6/14
[52] U.S. Cl. ..................................... 429/197; 429/198
[58] Field of Search ............... 429/198, 197, 194, 188, 429/199, 201; 423/301

[56] References Cited

U.S. PATENT DOCUMENTS 3,607,020 9/1971 Smith, Jr. .............................. 423/301
4,176,214 11/1979 Klinedinst et al. .................. 429/194
4,321,314 3/1982 Bowden et al. ................ 429/197 X
4,345,010 8/1982 Glugla .................................. 429/197
4,770,959 9/1988 Koyama et al. ................ 429/194 X Primary Examiner—Anthony Skapars
Attorney, Agent, or Firm—Ronald S. Cornell; James B. McVeigh

[57] ABSTRACT

This invention relates to an improved method for preparing a non-aqueous electrolyte comprising lithium hexafluorophosphate, $LiPF_6$, and electrochemical cells containing same. In particular the method involves forming $LiPF_6$ by a chemical reaction in the presence of an ether, whereby a complex of $LiPF_6$ and the ether is formed and readily isolated. An electrolyte is prepared by dissolving the complex in non-aqueous solvents to the desired concentration.

17 Claims, No Drawings

METHOD FOR PREPARING NON-AQUEOUS ELECTROLYTES

This invention relates to an improved method for preparing a non-aqueous electrolyte comprising lithium hexafluorophosphate ($LiPF_6$) and electrochemical cells containing same. In particular the method involves forming $LiPF_6$ in the presence of an ether whereby a complex of $LiPF_6$ and the ether is formed and readily isolated. An electrolyte is prepared by dissolving the complex in non-aqueous solvents to the desired concentration.

Electrochemical cells employing lithium anodes have become widely accepted for use in many electronic devices. In particular, lithium/manganese dioxide cells and lithium/carbon monofluoride cells are sold annually by the millions. Thus, these electrochemical systems are in a mature stage of development and are the product of extensive research efforts which began in the mid-seventies.

Of particular importance in lithium cells is the electrolyte formulation because the rate capability of these cells is dependent on the conductivity of the electrolyte. The years of research efforts on lithium cells has resulted in the identification of only a handful of lithium salts which are readily available and which form sufficiently conductive solutions in non-aqueous solvents. These are $LiAsF_6$, $LiPF_6$, $LiClO_4$, $LiBF_4$, and $LiCF_3SO_3$.

In a given non-aqueous solvent, such as a 1:1 solution of propylene carbonate and dimethoxyethane, the most conductive electrolytes are formed by $LiAsF_6$ and $LiPF_6$; $LiClO_4$ forms a less conductive electrolyte than these two; and $LiBF_4$ forms a less conductive electrolyte than $LiClO_4$. The least conductive electrolyte is formed by $LiCF_3SO_3$. Yet, in commercially available cells, the most widely used salts are $LiBF_4$ and $LiCF_3SO_3$. $LiAsF_6$ is used only in limited applications because of the toxicity issues surrounding arsenic. However this salt is available in very pure form and can be easily handled without decomposition. $LiClO_4$ is used only in very limited applications because the perchlorate anion, $ClO_4^-$, is a strong oxidant and requires that precautions be taken to render it safe when used in a cell. $LiPF_6$ does not have either the toxicity problems of $LiAsF_6$ or the reactivity problems of $LiClO_4$. Rather, $LiPF_6$ has the problem that it is unstable in its pure form, decomposing to $PF_5$ and $LiF$.

There are many references in the prior art to the suitability of $LiPF_6$ as an electrolyte salt. This is based primarily on the conductivity of the salt and not its stability. Commercially available $LiPF_6$ suffers from the decomposition problem described above. The decomposition products cause polymerization of electrolytes containing commonly used non-aqueous solvents. Such polymerization is fatal to the normal operation of a lithium cell. Attempts have been made to solve the decomposition problem of $LiPF_6$ so that this very conductive salt could be used in commercially available lithium cells. The failure of these attempts is evidenced by the fact that none of the manufacturers of lithium cells use $LiPF_6$ in their product.

One approach has been to form a complex of commercially available $LiPF_6$ and an ethylene glycol ether. The complex can be isolated as crystals and recrystallization is carried out on the crystals to remove impurities contained in the $LiPF_6$. Such complexes are known to stabilize the reactivity of $LiPF_6$ and are described in U.S. Pat. No. 4,321,314 Japanese Kokai No. 58-163,175, and Japanese Kokai No. 58-161,190. The problem with all of these approaches is that they begin with commercially available $LiPF_6$ which, by its nature, has already slightly decomposed.

It is therefore an object of the present invention to provide a method for preparing an $LiPF_6$ electrolyte which does not use $LiPF_6$ as a starting material, and thus would not contain the impurities which result from the decomposition of $LiPF_6$.

Generally speaking, the present invention is a method for preparing a stable $LiPF_6$ electrolyte by dissolving a salt having a cation comprising an adduct of a proton and a Lewis base, and an anion comprising $PF_6^-$, in a solvent comprising an ether capable of forming an isolatable complex with $LiPF_6$, adding a lithium base to the solution whereby $LiPF_6$ and its complex with the ether are formed simultaneously in-situ, and isolating the $LiPF_6$-ether complex. The method further comprises dissolving the complex to the desired concentration in non-aqueous solvents to give a stable $LiPF_6$ electrolyte. An advantage of the present method is that the $LiPF_6$ salt is never isolated in the absence of the ether complex. Thus, the salt exists in a stabilized form from the moment it is synthesized.

In a preferred embodiment, the salt has the general formula $(XH)PF_6$, wherein X is a Lewis base comprising a Group 5a element of the Periodic Chart of the Elements and H is a proton such that the adduct, XH, has a charge of +1.

It is preferred that the Lewis base "X" comprises nitrogen or phosphorous. Examples of Lewis bases containing nitrogen are $NH_3$, $NRH_2$, $NRR'H$, and $NRR'R''$ where R, R', and R'' are the same or different $C_1$-$C_4$ alkyl groups such as, but not limited to, methyl, ethyl, propyl, or butyl. Cyclic nitrogen compounds such as pyridine are also encompassed by the present method. Examples of Lewis bases containing phosphorous are $PH_3$, $PRH_2$, $PRR'H$, and $PRR'R''$ where R, R', and R''' are the same or different alkyl groups as set forth above. It is most preferred that the Lewis base is $NH_3$.

Ethers which form an isolatable complex with $LiPF_6$ include those ethers having at least two ether functionalities. The oxygen atoms of the ether functionalities should be separated by a distance such that the lone pair electrons on each oxygen are capable of simultaneously "binding" to a lithium cation to form the $LiPF_6$-ether complex. Examples of preferred ethers include, but are not limited to, 1,2-dimethoxyethane (DME), 1,3-dimethoxy propane, diglyme, triglyme, tetraglyme, methyltetrahydrofurfuryl ether, 1,4-dioxane, and methoxy methyltetrahydrofuran. The most preferred ether is DME.

A suitable lithium base is one that is capable of abstracting the proton from the Lewis base in the cation of the salt while at the same time releasing a lithium cation $Li^+$. Some lithium bases are such strong bases that they can also be characterized as reducing agents, an example of which is butyl lithium. Therefore, a variety of base strengths are suitable for the lithium bases contemplated by the present invention. Suitable lithium bases includes, but are not limited to, LiH, LiOR (R is an alkyl), $LiNH_2$, LiNRH and LiNRR' (where R and R'' are the same or different alkyls). Also included are organo lithium compounds such as lithium naphthalenide, lithium benzophenone ketyl, and alkyl lithiums such as butyl lithium. The most preferred lithium base is lithium hydride, LiH.

Thus, in accordance with the most preferred method, a stable LiPF$_6$ electrolyte is prepared by dissolving NH$_4$PF$_6$ in a solvent comprising 1,2-dimethoxyethane, adding LiH thereto to form the complex LiPF$_6$-2DME (the other reaction products are NH$_3$ and H$_2$ which escape as gas), isolating the LiPF$_6$-2DME complex, and dissolving the complex in non-aqueous solvents to the desired concentration.

The features and advantages of the present invention are illustrated by the following examples. All parts are parts by weight unless otherwise specified.

EXAMPLES A, B, AND C (PRIOR ART)

Commercially available LiPF$_6$ is obtained from three different vendors: Aldrich (Example A), Ventron (Example B), and Ozark Mahoning (Example C). The "as received" LiPF$_6$ is not opened until it is brought into a glove box under an argon atmosphere so that decomposition due to reaction with atmospheric moisture is prevented. A 1 molar solution of LiPF$_6$ from each vendor is prepared by adding, in separate containers, 76 grams of each to a mixture of propylene carbonate and dioxolane and bringing the volume up to 500 ml. Each solution also contains 0.1% pyridine to inhibit polymerization. Upon the addition of LiPF$_6$ from each vendor to the solvent mixture the solutions begin to polymerize. Each solution polymerizes to a solid mass despite the presence of pyridine.

EXAMPLE 1

A 3-neck, 2 liter round bottom flask and a solids addition apparatus are brought into an argon filled glove box. Into the flask is added 800 ml of 1,2-dimethoxyethane (DME) and a magnetic stir bar. While stirring, 326 grams of NH$_4$PF$_6$ is added to the round bottom flask. Stirring is continued until all of the NH$_4$PF$_6$ is dissolved. The round bottom flask is stoppered. Into the solid addition apparatus is added 17.4 grams of LiH and the apparatus is stoppered. The stoppered flask and apparatus are removed from the glove box and placed under a vented hood.

The flask is clamped in place over a stirrer and the flask is equipped with a bubbler, a condenser, and the solids addition apparatus. An argon purge is run through the bubbler and flask. The LiH is added over a 4 hour period. The addition is accompanied by NH$_3$ evolution which indicates that the formation of LiPF$_6$ is taking place. After the addition is complete the contents of the flask are heated to 80° C. until the off gas is no longer strongly basic. The solution is cooled whereby it substantially solidifies.

The LiPF$_6$-2DME complex is isolated by adding an additional 200 ml DME to the solid and heating the mixture to dissolve the solid. The hot liquid is filtered through a coarse filter and the filtrate volume is reduced on a rotary evaporator until crystals begin to appear. Once crystals appear, the volume reduction is stopped and the filtrate is cooled. A substantial amount of white crystals precipitate and they are separated from the filtrate by filtering. Volume reduction is again repeated on the filtrate and more crystals are obtained. The final yield of LiPF$_6$-2DME is 640 grams which represents a 97% yield (based on ammonium hexafluorophosphate).

EXAMPLE 2

An electrolyte is prepared by taking 166 grams of LiPF$_6$-2DME as prepared in Example 1 and adding it to a solution of propylene carbonate and dioxolane (50:50 by volume) with 0.1% pyridine added and bringing the total volume up to 500 ml. A 1 molar LiPF$_6$ electrolyte results which is clear and does not polymerize. The electrolyte has a conductivity of $1.3 \times 10^{-2}$ ohm$^{-1}$ cm$^{-1}$ measured at 1 kHz at room temperature.

EXAMPLE 3

The method set forth in Example 1 is repeated with diglyme substituted for the DME. This results in the formation of a complex of LiPF$_6$ and diglyme which is isolated as white crystals. The complex is added to a solution of propylene carbonate and dioxolane (50:50 by volume) with 0.1% pyridine added the volume is brought up to 500 ml so that a 1 molar LiPF$_6$ electrolyte results. The electrolyte is clear and does not polymerize. The conductivity of the electrolyte measured at 1 kHz at room temperature is $1.2 \times 10^{-2}$ ohm$^{-1}$ cm$^{-1}$.

EXAMPLE 4

The method set forth in Example 1 is repeated with diethoxyethane substituted for the DME. This results in the formation of a complex of LiPF$_6$ and diethoxyethane which is isolated as white crystals. The complex is added to a solution of propylene carbonate and dioxolane (50:50 by volume) with 0.1% pyridine added. The volume is brought up to 500 ml so that a 1 molar LiPF$_6$ electrolyte results. The electrolyte is clear and does not polymerize. The conductivity of the electrolyte measured at 1 kHz at room temperature is $1.2 \times 10^{-2}$ ohm$^{-1}$ cm$^{-1}$.

EXAMPLE 5

The LiPF$_6$ 2DME complex made in accordance with Example 1 is used to prepare an electrolyte comprising propylene carbonate (PC) and 2-methyltetrahydrofuran (2-MeTHF) (50:50 by volume). A mixture of PC and 2-MeTHF is added to 166 grams of the complex until a 500 ml solution is obtained. The result is a 1 molar LiPF$_6$-2DME PC/2-MeTHF electrolyte which is clear and does not polymerize. The electrolyte has a conductivity of $1.3 \times 10^{-1}$ ohm$^{-1}$ cm$^{-1}$ at 1 kHz at room temperature.

EXAMPLE 6

The LiPF$_6$-2DME complex made in accordance with Example 1 is used to prepare an electrolyte comprising propylene carbonate (PC) and 4-methyldioxolane (4-MeDx) (50:50 by volume). A mixture of PC and 4-MeDx is added to 166 grams of the complex until a 500 ml solution is obtained. The result is a 1 molar LiPF$_6$-2DME PC/4-MeDx electrolyte which is clear and does not polymerize. The electrolyte has a conductivity of $1.3 \times 10^{-1}$ ohm$^{-1}$ cm$^{-1}$ at 1 kHz at room temperature.

EXAMPLES 7-10

The electrolytes prepared in accordance with Examples 2 and 4-6 are used in electrochemical cells for Examples 7-10 respectively. Each cell is of identical construction with the exception that the different electrolytes are used.

Eight 2/3A size lithium manganese dioxide cells are built having a lithium foil electrode 0.007 inch thick, 9 inches long, and 0.9 inch wide; a manganese dioxide cathode 0.015 inch thick, 10 inches long, and 1 inch wide; and a microporous polypropylene separator 0.001 inch thick. The electrodes are spirally wound together with the separator therebetween. For each example, two cells are filled each with 2 ml of the respective electrolyte and a cell cover is crimped in place on each cell. One cell is discharged across 8 ohms and the other cell is discharged across 100 ohms. The capacity delivered in amp-Hr to a 1 volt cut-off for each cell is given in Table I.

TABLE I

| Example # | Electrolyte | 8 Ohm Test | 100 Ohm Test |
|---|---|---|---|
| 7 | Example 2 | 1.2 | 1.3 |
| 8 | Example 4 | 1.1 | 1.4 |
| 9 | Example 5 | 1.2 | 1.4 |
| 10 | Example 6 | 1.1 | 1.3 |

By way of comparison a cell having a conventional electrolyte such as 1 molar $LiCF_3SO_3$ in propylene carbonate/dimethoxyethane (67:33 by volume) would deliver 1.2 amp-Hr at 8 ohms and 1.3 amp-Hr at 100 ohms. Thus, cells containing electrolytes prepared in accordance with the present invention perform as well as cells containing a conventional electrolyte.

While the examples employed electrolytes having a $LiPF_6$ concentration of 1 molar, suitable electrolytes can be prepared having a final concentration of between about 0.5 and 1 molar.

While the examples employed solvent ratios of 50:50 to prepare the electrolytes, ratios of propylene carbonate and the co-solvent can vary from 2:1 to 1:4 by volume without detrimentally effecting electrolyte viscosity, conductivity, and reactivity.

It is to be understood that the specific examples are for illustrative purposes only. Deviations can be made by one having ordinary skill in the art and still remain within the scope of the present invention.

What is claimed is:

1. A method for preparing an improved electrolyte containing $LiPF_6$ for use in an electrochemical cell comprising dissolving a salt, having a cation comprising an adduct of a proton and a Lewis base, and an anion comprising $PF_6^-$, in a solvent comprising an ether capable of forming an isolatable complex with $LiPF_6$; adding a lithium base to the solution whereby $LiPF_6$ and the complex of $LiPF_6$ and ether are formed simultaneously; and isolating the $LiPF_6$-ether complex.

2. The method of claim 1 wherein the salt has the general formula $(XH)PF_6$ wherein X is a Lewis base containing an element of Group 5A of the Periodic Chart of the Elements and H is a proton, whereby the adduct XH has a charge of +1.

3. The method of claim 2 wherein X comprises an element selected from the group consisting of nitrogen and phosphorous.

4. The method of claim 2 wherein X is selected from the group consisting of $NH_3$, $NRH_2$, $NRR'H$, and $NRR'R''$ where R, R', and R'' are the same or different $C_1$ to $C_4$ alkyl groups, and pyridine.

5. The method of claim 2 wherein X is selected from the group consisting of $PH_3$, $PRH_2$, $PRR'H$, and $PRR'R''$ where R, R', and R''' are the same or different $C_1$ to $C_4$ alkyl groups.

6. The method of claim 2 wherein the lithium base is selected from the group consisting of LiH, LiOR (R is an alkyl), $LiNH_2$, LiNRH and LiNRR' (where R and R'' are the same or different alkyls), lithium naphthalenide, lithium benzophenone ketyl, and butyl lithium.

7. The method of claim 6 wherein the ether is selected from the group consisting of 1,2-dimethoxyethane (DME), 1,3-dimethoxy propane, diglyme, triglyme, tetraglyme, methyltetrahydrofurfuryl ether, 1,4-dioxane, and methoxy methyltetrahydrofuran.

8. The method of claim 4 wherein the lithium base comprises LiH and the ether comprises 1,2-dimethoxyethane.

9. The method of claim 8 further comprising dissolving the $LiPF_6$-ether complex in 1,2-dimethoxy ethane; recrystallizing the complex; and again isolating the $LiPF_6$-ether complex.

10. The method of claim 9 further comprising dissolving the complex in a mixture of propylene carbonate and dioxolane of between 2:1 and 1:4 parts by volume in an amount sufficient to give an electrolyte having a $LiPF_6$ concentration of between about 0.5 and 1 molar.

11. The method of claim 9 further comprising dissolving the complex in a mixture of propylene carbonate and 2-tetrahydrofuran of between 2:1 and 1:4 parts by volume in an amount sufficient to give an electrolyte having a $LiPF_6$ concentration of between about 0.5 and 1 molar.

12. The method of claim 9 further comprising dissolving the complex in a mixture of propylene carbonate and 4-methyldioxolane of between 2:1 and 1:4 parts by volume in an amount sufficient to give an electrolyte having a $LiPF_6$ concentration of between about 0.5 and 1 molar.

13. A method for preparing an improved electrolyte containing $LiPF_6$ for use in an electrochemical cell comprising dissolving $NH_4PF_6$ in a solvent comprising 1,2-dimethoxyethane; adding lithium hydride thereto whereby $LiPF_6$ and a complex of $LiPF_6$ and 1,2-dimethoxyethane are formed simultaneously; and isolating the $LiPF_6$-1,2-dimethoxyethane complex.

14. The method of claim 13 further comprising dissolving; recrystallizing; and isolating again the $LiPF_6$-1,2-dimethoxyethane complex.

15. The method of claim 13 and further comprising dissolving the complex in an electrolyte solvent in an amount sufficient to give an electrolyte having a $LiPF_6$ concentration of 1 molar.

16. The method of claim 15 wherein said electrolyte solvent is selected from the group consisting of a mixture of propylene carbonate and dioxolane of about equal parts by volume, a mixture of propylene carbonate and 2-tetrahydrofuran of about equal parts by volume, and a mixture of propylene carbonate and 4-methyldioxolane of about equal parts by volume.

17. An electrolyte made in accordance with claim 12.

* * * * *